US012622840B1

(12) United States Patent
He

(10) Patent No.: US 12,622,840 B1
(45) Date of Patent: May 12, 2026

(54) DOUBLE-RETRACTABLE PENIS MASSAGE DEVICE

(71) Applicant: Fayong He, Xichong County (CN)

(72) Inventor: Fayong He, Xichong County (CN)

( * ) Notice: Subject to any disclaimer, the term of this patent is extended or adjusted under 35 U.S.C. 154(b) by 14 days.

(21) Appl. No.: 19/241,385

(22) Filed: Jun. 18, 2025

(30) Foreign Application Priority Data

Apr. 24, 2025 (CN) ......................... 202520791559.4

(51) Int. Cl.
*A61H 19/00* (2006.01)

(52) U.S. Cl.
CPC ..... *A61H 19/32* (2013.01); *A61H 2201/1215* (2013.01); *A61H 2201/149* (2013.01); *A61H 2201/1669* (2013.01); *A61H 2201/1692* (2013.01)

(58) Field of Classification Search
CPC ...................................................... A61H 19/32
See application file for complete search history.

(56) References Cited

U.S. PATENT DOCUMENTS

| | | | | |
|---|---|---|---|---|
| 11,737,949 | B1 * | 8/2023 | Huang | A61H 19/32 600/38 |
| 11,752,063 | B1 * | 9/2023 | Huang | A61H 19/32 600/38 |
| 2023/0126338 | A1 * | 4/2023 | Shao | A61H 15/0078 600/38 |

FOREIGN PATENT DOCUMENTS

| | | | | |
|---|---|---|---|---|
| CN | 117547451 A | * | 2/2024 | A61H 19/32 |
| GB | 2634638 A | * | 4/2025 | A61H 19/32 |

* cited by examiner

*Primary Examiner* — Charles A Marmor, II
*Assistant Examiner* — Marc D. Honrath
(74) *Attorney, Agent, or Firm* — Sandy Lipkin

(57) ABSTRACT

Disclosed is a double-retractable penis massage device, including a housing, a massage member and a drive device. The massage member includes a first sleeve and a second sleeve, the first sleeve and the second sleeve are movably arranged in an axial direction, the first sleeve is positioned at a front end of the second sleeve, and two ends of the first sleeve are axially arranged in a penetrating manner, such that a glans penis can penetrate the first sleeve and enter the second sleeve; and the drive device is arranged in the housing and is connected to the first sleeve and the second sleeve in a transmission manner separately, such that the drive device drives the first sleeve and the second sleeve to reciprocate in the axial direction separately, and reciprocating speeds of the first sleeve and the second sleeve are different and/or reciprocating movements are asynchronous.

20 Claims, 7 Drawing Sheets

DOUBLE-RETRACTABLE PENIS MASSAGE DEVICE

CROSS REFERENCE TO RELATED APPLICATIONS

The present disclosure claims the priority of Chinese Patent Application No. 202520791559.4 filed on Apr. 24, 2025. All the above are hereby incorporated by reference in their entirety.

TECHNICAL FIELD

The present disclosure relates to the technical field of penis massage, and in particular to a double-retractable penis massage device.

BACKGROUND

Currently, penile massage devices are configured to mimic a vaginal environment and provide massage stimulation to a male genital organ, typically by vibrating a sleeve to produce a massage effect. However, the existing penis massage devices rely only on a single movement to stimulate the male genital organ. With a single massage action, a stimulation effect on a penis is poor, and use experience is poor.

SUMMARY

An objective of the present disclosure is to provide a double-retractable penis massage device, so as to solve a technical problem of poor stimulation experience of a penis in the prior art.

In order to achieve the above objective, in a first aspect, a technical solution of the present disclosure provides a double-retractable penis massage device, including:

- a housing;
- a massage member including a first sleeve and a second sleeve that are coaxially arranged, where the first sleeve and the second sleeve are movably arranged in an axial direction, a first massage cavity is arranged in the first sleeve, a second massage cavity is arranged in the second sleeve, the first sleeve is positioned at a front end of the second sleeve, and two ends of the first massage cavity are axially arranged in a penetrating manner, such that a glans penis penetrates the first massage cavity and enters the second massage cavity; and
- a drive device arranged in the housing and connected to the first sleeve and the second sleeve in a transmission manner separately, such that the drive device drives the first sleeve and the second sleeve to reciprocate in the axial direction separately, where reciprocating speeds of the first sleeve and the second sleeve are different and/or reciprocating movements are asynchronous.

Further, the first sleeve and the second sleeve are of an integrated structure or a separate structure, the first sleeve and the second sleeve are made of flexible material, and a plurality of massage protrusions are arranged on inner walls of the first sleeve and the second sleeve.

Further, the first sleeve and the second sleeve are integrally made of the flexible material, and a first corrugated pipe or a first flexible elastomer that is retractable in axial length is in communication between the first sleeve and the second sleeve.

Further, a positioning portion is fixedly mounted at a front end of the housing, and a positioning opening for inserting a penis into the first sleeve and the second sleeve is formed at a center of the positioning portion.

Further, a second corrugated pipe or a second flexible elastomer that is retractable in axial length is in communication between the first sleeve and the positioning portion.

Further, an annular groove is circumferentially formed on an outer peripheral surface of the positioning portion, a fixing ring is arranged at the front end of the housing, and a convex ring is formed on an inner peripheral surface of the fixing ring, such that the convex ring is inserted into the annular groove to fix the positioning portion in the housing.

Further comprising a first ring sleeve and a second ring sleeve, wherein the first ring sleeve and the second ring sleeve are movably arranged in the housing in the axial direction, the first ring sleeve sleeves the first sleeve, the second ring sleeve sleeves the second sleeve, and the drive device is connected to the first ring sleeve and the second ring sleeve in a transmission manner separately.

Further, the drive device comprises:

- a drive motor, wherein the drive motor is arranged in the housing
- a first transmission mechanism, wherein the first transmission mechanism is connected between the motor and the first sleeve in a transmission manner; and
- a second transmission mechanism, wherein the second transmission mechanism is connected between the motor and the second sleeve in a transmission manner, such that the first transmission mechanism drives the first sleeve to reciprocate in the axial direction through the motor, and the second transmission mechanism drives the second sleeve to reciprocate in the axial direction through the motor.

Further, the drive motor comprises a first output shaft and a second output shaft, the drive motor is connected to the first transmission mechanism through the first output shaft in a transmission manner, and the drive motor is connected to the second transmission mechanism through the second output shaft in a transmission manner.

Further, the drive device further comprises:

- a first guide structure, wherein the first guide structure is arranged between the housing and the first sleeve, so as to guide the first sleeve to reciprocate axially through the first guide structure; and
- a second guide structure, wherein the second guide structure is arranged between the housing and the second sleeve, so as to guide the second sleeve to reciprocate axially through the second guide structure.

Further, the first transmission mechanism comprises a first eccentric wheel, a first connector and a first connecting rod, the first eccentric wheel is connected to the drive motor in a transmission manner, one end of the first connector is hinged to an eccentric position of the first eccentric wheel, the other end of the first connector is hinged to one end of the first connecting rod, and the other end of the first connecting rod is fixedly connected to the first sleeve; and/or

- the second transmission mechanism comprises a belt transmission mechanism, a second eccentric wheel, a second connector and a second connecting rod, an input end of the belt transmission mechanism is connected to the drive motor in a transmission manner, an output end of the belt transmission mechanism is connected to the second eccentric wheel in a transmission manner, one end of the second connector is hinged to an eccentric position of the second eccentric wheel, the other end of the second connector is hinged to one end of the second connecting rod, and the other end of the second connecting rod is fixedly connected to the second sleeve.

In a second aspect, a technical solution of the present disclosure provides a double-retractable penis massage device, including:

a housing;

a massage member including a first sleeve and a second sleeve that are coaxially arranged, where the first sleeve and the second sleeve are movably arranged in an axial direction, the first sleeve and/or the second sleeve are/is of a tubular structure, a first massage cavity is arranged in the first sleeve, a second massage cavity is arranged in the second sleeve, the first sleeve is positioned at a front end of the second sleeve, and two ends of the first massage cavity are axially arranged in a penetrating manner, such that a glans penis penetrates the first massage cavity and enters the second massage cavity; and a drive device arranged in the housing and connected to the first sleeve and the second sleeve in a transmission manner separately, such that the drive device drives the first sleeve and the second sleeve to reciprocate in the axial direction separately, where reciprocating speeds of the first sleeve and the second sleeve are different and/or reciprocating movements are asynchronous.

Further, the first sleeve and the second sleeve are of an integrated structure or a separate structure, the first sleeve and the second sleeve are made of flexible material, and a plurality of massage protrusions are arranged on inner walls of the first sleeve and the second sleeve.

Further, the first sleeve and the second sleeve are integrally made of the flexible material, and a first corrugated pipe or a first flexible elastomer that is retractable in axial length is in communication between the first sleeve and the second sleeve.

Further, a positioning portion is fixedly mounted at a front end of the housing, and a positioning opening for inserting a penis into the first sleeve and the second sleeve is formed at a center of the positioning portion, a second corrugated pipe or a second flexible elastomer that is retractable in axial length is in communication between the first sleeve and the positioning portion.

Further, an annular groove is circumferentially formed on an outer peripheral surface of the positioning portion, a fixing ring is arranged at the front end of the housing, and a convex ring is formed on an inner peripheral surface of the fixing ring, such that the convex ring is inserted into the annular groove to fix the positioning portion in the housing.

Further comprising a first ring sleeve and a second ring sleeve, wherein the first ring sleeve and the second ring sleeve are movably arranged in the housing in the axial direction, the first ring sleeve sleeves the first sleeve, the second ring sleeve sleeves the second sleeve, and the drive device is connected to the first ring sleeve and the second ring sleeve in a transmission manner separately.

In a third aspect, a technical solution of the present disclosure provides a double-retractable penis massage device, including:

a housing;

a massage member including a first sleeve and a second sleeve that are coaxially arranged, where the first sleeve and the second sleeve are movably arranged in an axial direction, the first sleeve and/or the second sleeve are/is of a tubular structure, a first massage cavity is arranged in the first sleeve, a second massage cavity is arranged in the second sleeve, the first sleeve is positioned at a front end of the second sleeve, two ends of the first sleeve are axially arranged in a penetrating manner, one end of the second sleeve close to the first sleeve is an open end, and one end of the second sleeve away from the first sleeve is a closed end, such that a glans penis penetrates the first massage cavity and enters the second massage cavity; and a drive device arranged in the housing and connected to the first sleeve and the second sleeve in a transmission manner separately, such that the drive device drives the first sleeve and the second sleeve to reciprocate in the axial direction separately, where reciprocating speeds of the first sleeve and the second sleeve are different and/or reciprocating movements are asynchronous.

Further, the first sleeve and the second sleeve are integrally made of the flexible material, and a first corrugated pipe or a first flexible elastomer that is retractable in axial length is in communication between the first sleeve and the second sleeve.

Further, a positioning portion is fixedly mounted at a front end of the housing, and a positioning opening for inserting a penis into the first sleeve and the second sleeve is formed at a center of the positioning portion, a second corrugated pipe or a second flexible elastomer that is retractable in axial length is in communication between the first sleeve and the positioning portion.

It can be seen from the above technical solutions that the double-retractable penis massage device of the present disclosure enables the glans penis to penetrates the first sleeve and enter the second sleeve, and the first sleeve and the second sleeve are driven by the drive device to reciprocate in the axial direction separately, such that the first sleeve and the second sleeve perform retractable massage stimulation on different positions of the penis respectively, the first sleeve performs retractable massage on a middle portion of the penis, and the second sleeve performs retractable massage on the glans penis. The reciprocating speeds of the first sleeve and the second sleeve are different or the reciprocating movements are asynchronous, that is, retractable stimulation effects of the first sleeve and the second sleeve are different. In this way, the penis is stimulated by using the multi-stage different retractable massage effects together, such that a stimulation effect on the penis is enhanced, and desirable use experience is brought to a user.

BRIEF DESCRIPTION OF THE DRAWINGS

In order to illustrate the technical solution in embodiments of the present disclosure more clearly, the following briefly introduces accompanying drawings used in the description of the embodiments. Obviously, the accompanying drawings in the following description are only some embodiments of the present disclosure. Those of ordinary skill in the art can obtain other accompanying drawings from these accompanying drawings without any creative efforts.

Figure 1:
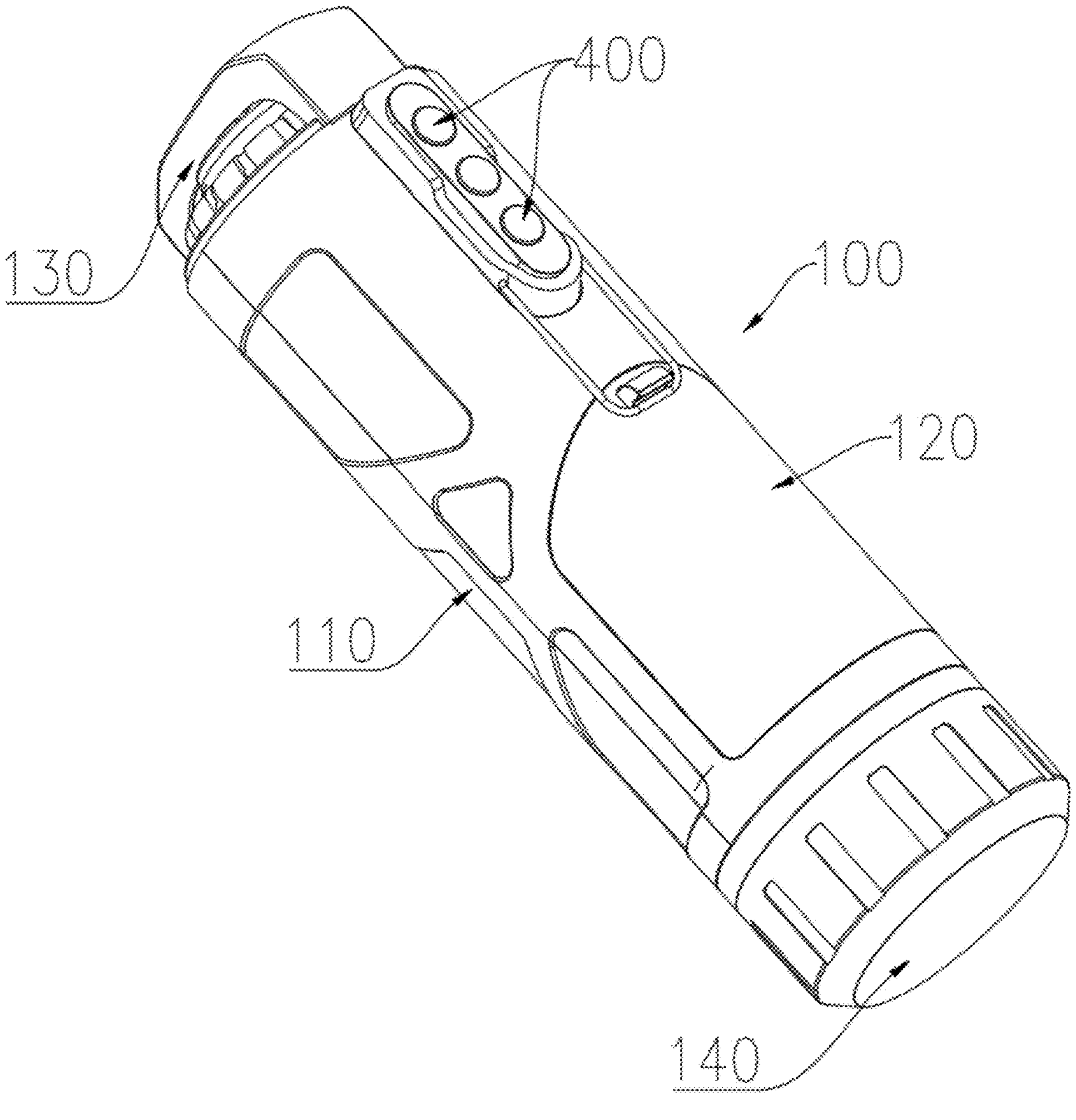
FIG. 1 is a perspective view of a double-retractable penis massage device according to an example of the present application.

The drawings include the following reference numerals:

100. housing; 110. left housing; 120. right housing; 130. tail cover; 140. front cover; 150. fixing ring; 151. convex ring; 160. motor base;

200. massage member; 210. first sleeve; 220. second sleeve; 230. first corrugated pipe; 240. second corrugated pipe; 250. positioning portion; 251. positioning opening; 252. annular groove;

300. drive device; 310. drive motor; 311. first output shaft; 312. second output shaft; 320. first eccentric wheel; 330. first connector; 340. first connecting rod; 350. first guide structure; 351. first guide rod; 352. first ring sleeve; 361. driving wheel; 362. driven wheel; 363. belt; 364. second eccentric wheel; 370. second connector; 380. second connecting rod; 390. second guide structure; 391. second ring sleeve; 392. second guide rod; and

400. control button.

DETAILED DESCRIPTIONS OF THE EMBODIMENTS

In order to make those skilled in the art better understand the technical solution of the present disclosure, the technical solution in the embodiments of the present disclosure will be clearly and completely described below with reference to accompanying drawings in the embodiments of the present disclosure. Obviously, the described embodiments are only a part of the embodiments of the present disclosure, but not all of the embodiments. Based on the embodiments of the present disclosure, all other embodiments obtained by those skilled in the art without any creative efforts fall within the protection scope of the present disclosure.

Figure 2:
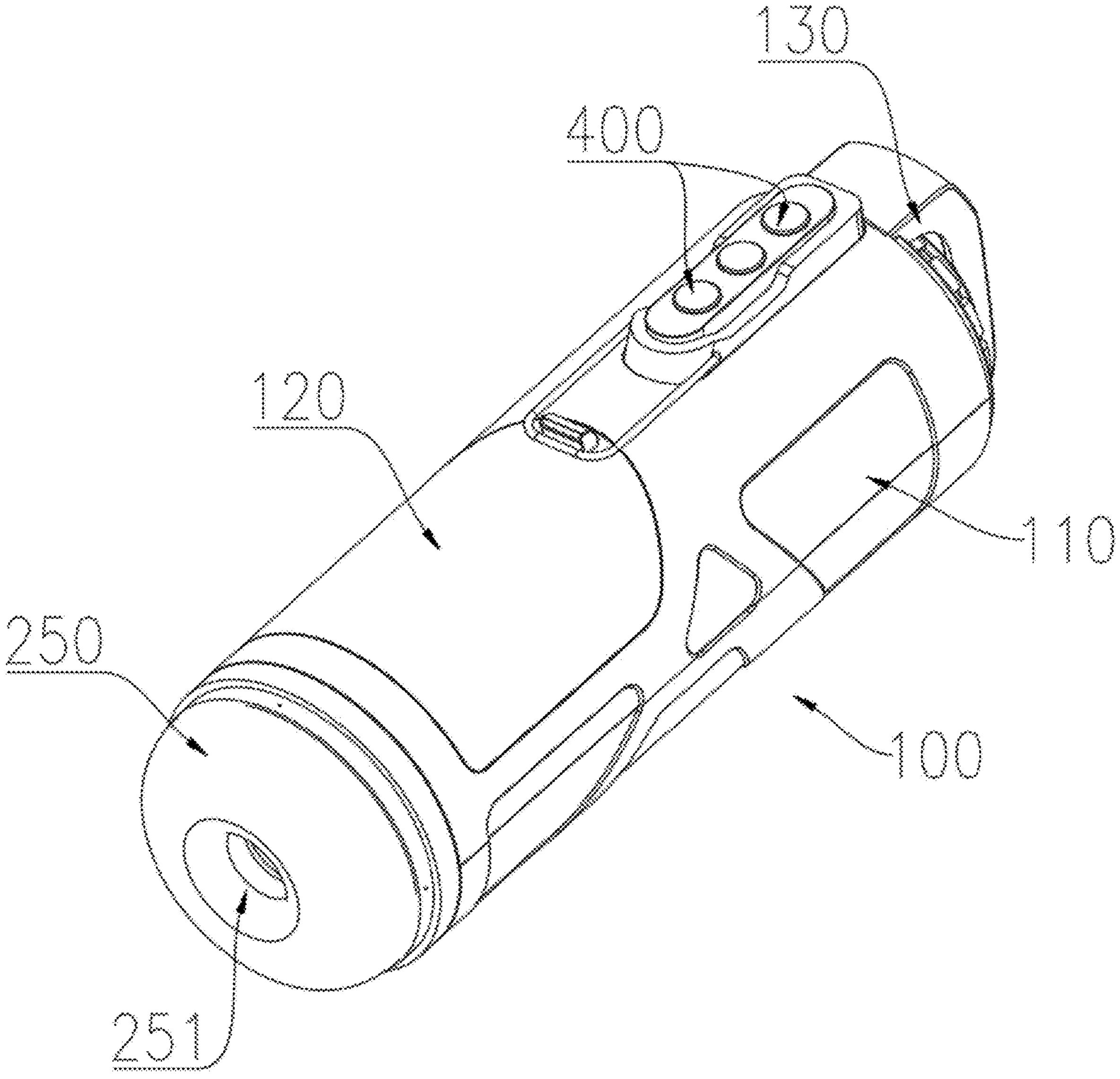
FIG. 2 is a perspective view of a double-retractable penis massage device with a front cover removed according to an example of the present application.
Figure 3:
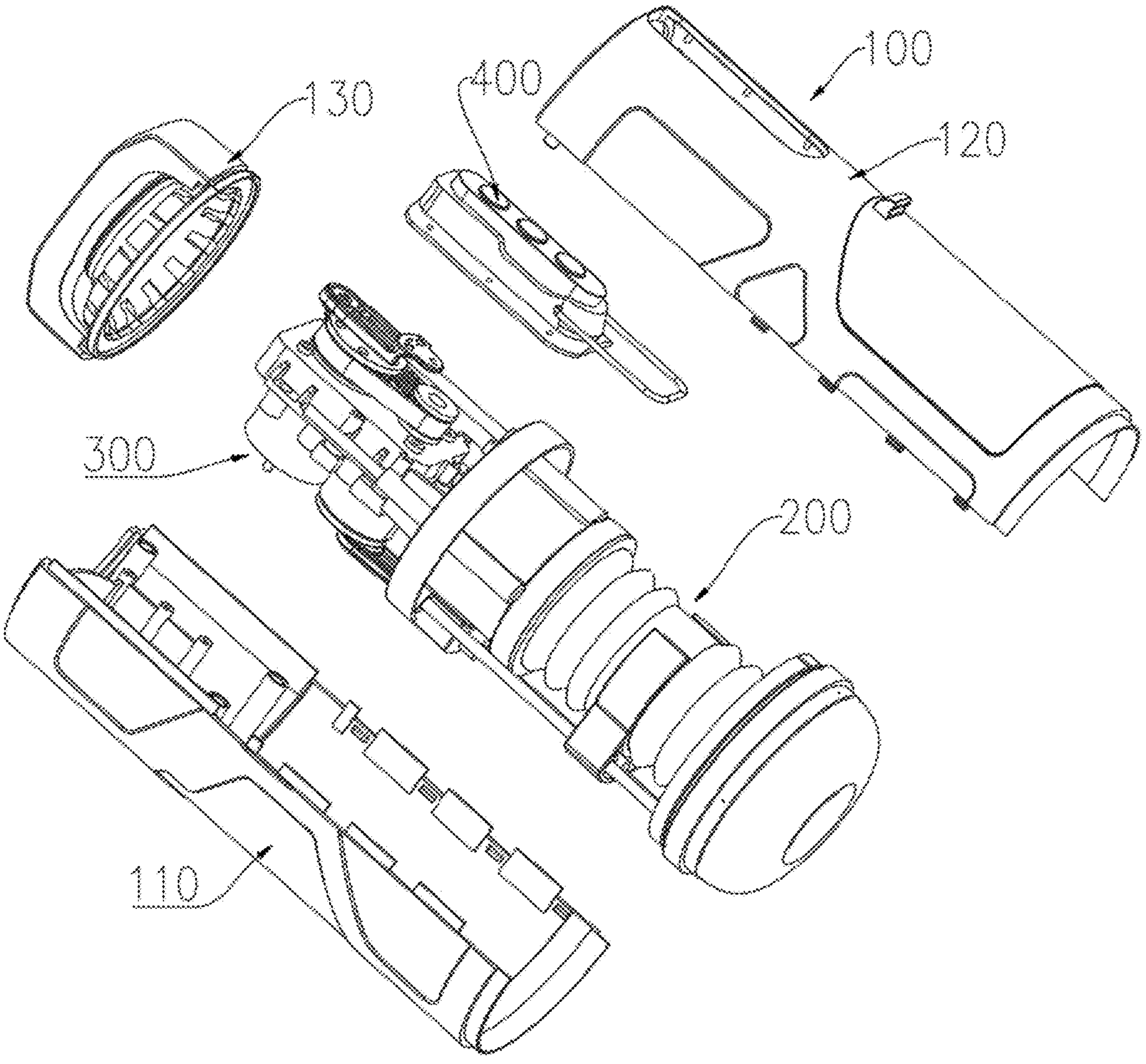
FIG. 3 is an exploded view of a double-retractable penis massage device according to an example of the present application.
Figure 4:
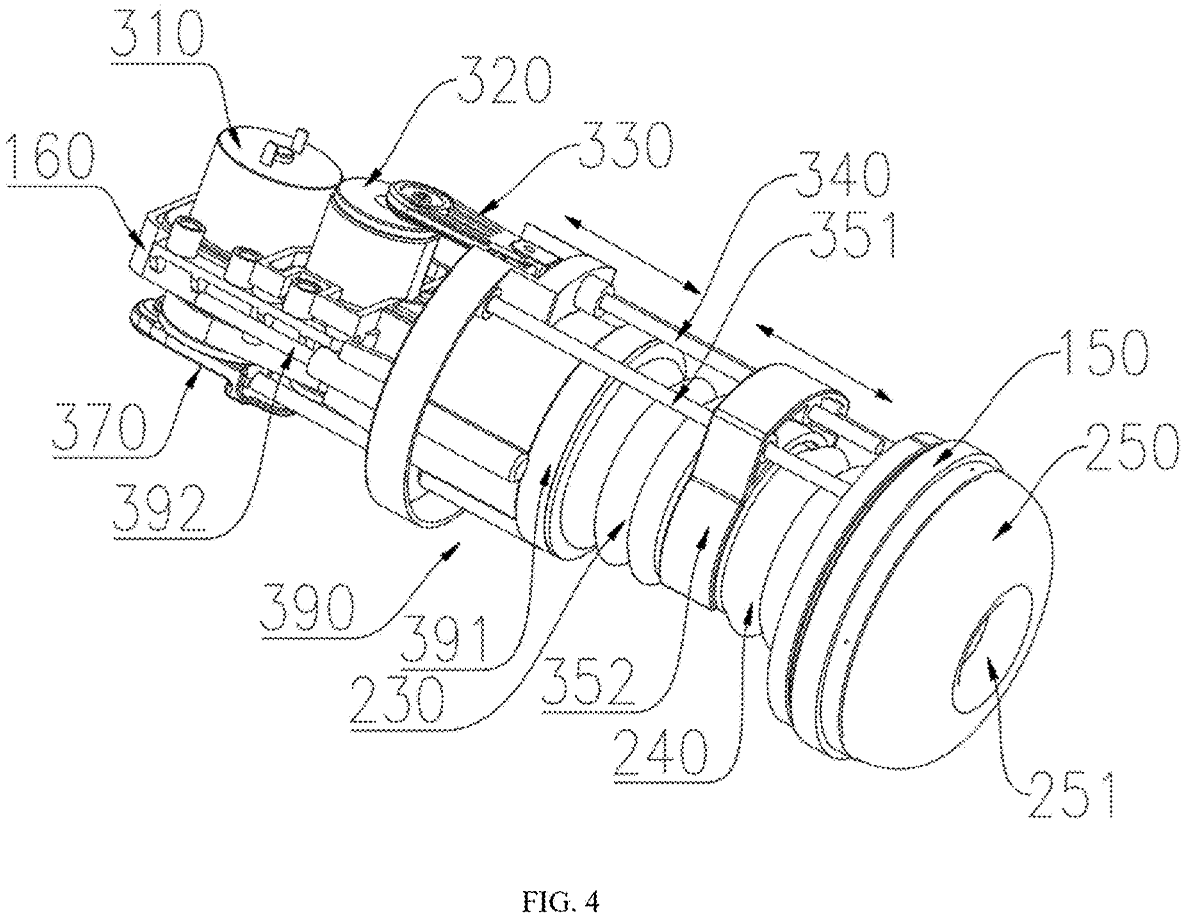
FIG. 4 is a schematic structural diagram of a double-retractable penis massage device with a housing removed according to an example of the present application.
Figure 5:
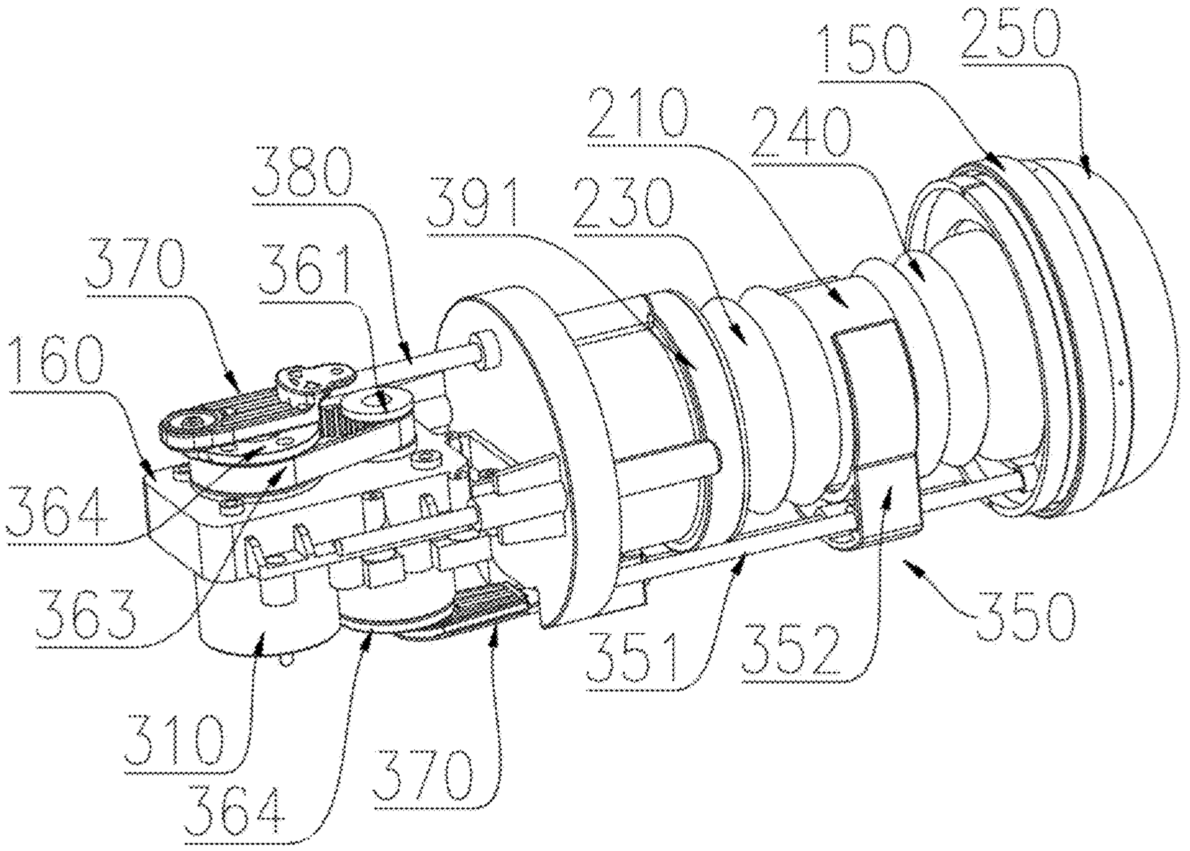
FIG. 5 is a schematic structural diagram of another perspective of a double-retractable penis massage device with a housing removed according to an example of the present application.
Figure 6:
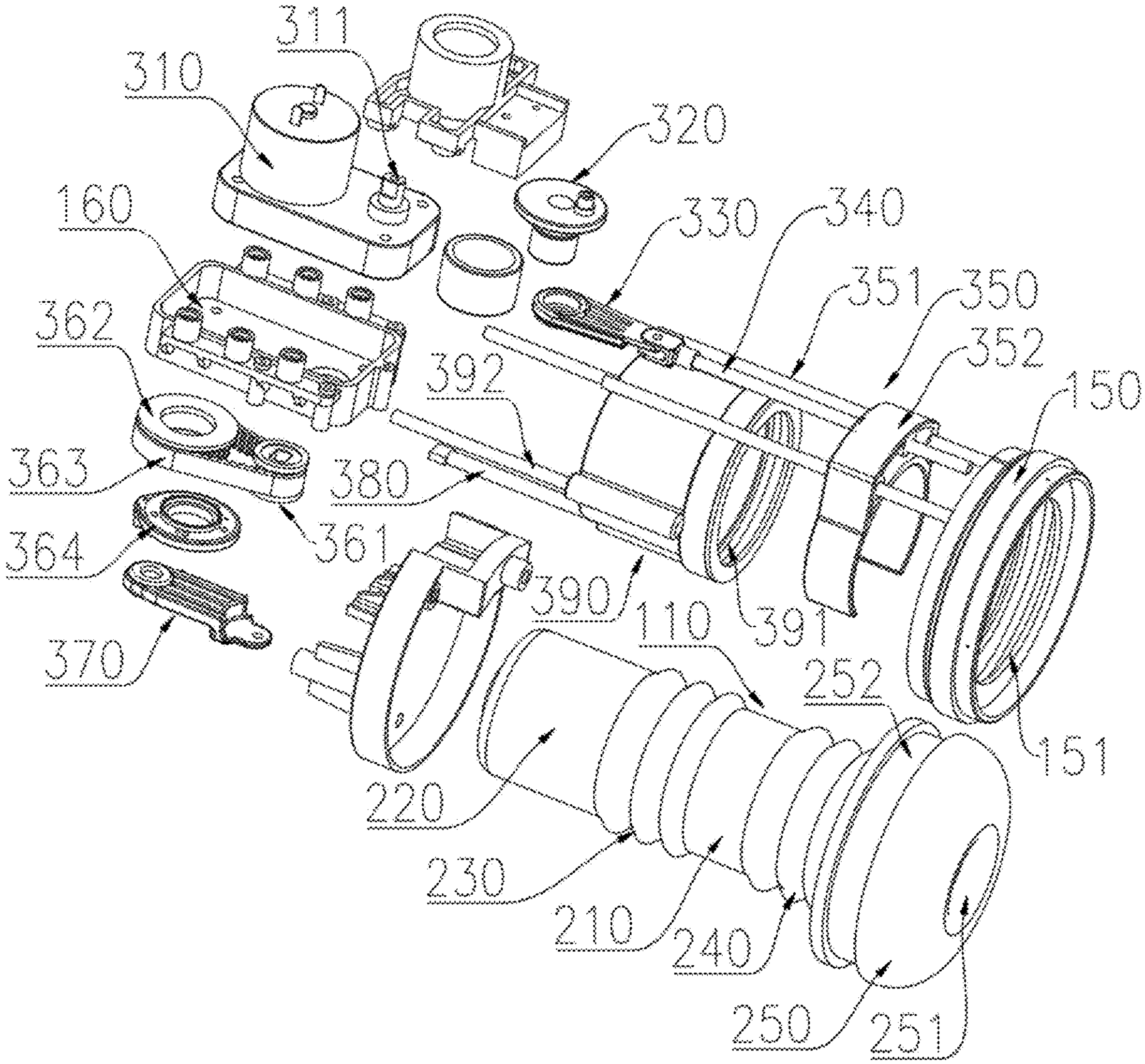
FIG. 6 is an exploded structural view of a part of a structure of a double-retractable penis massage device according to an example of the present application.
Figure 7:
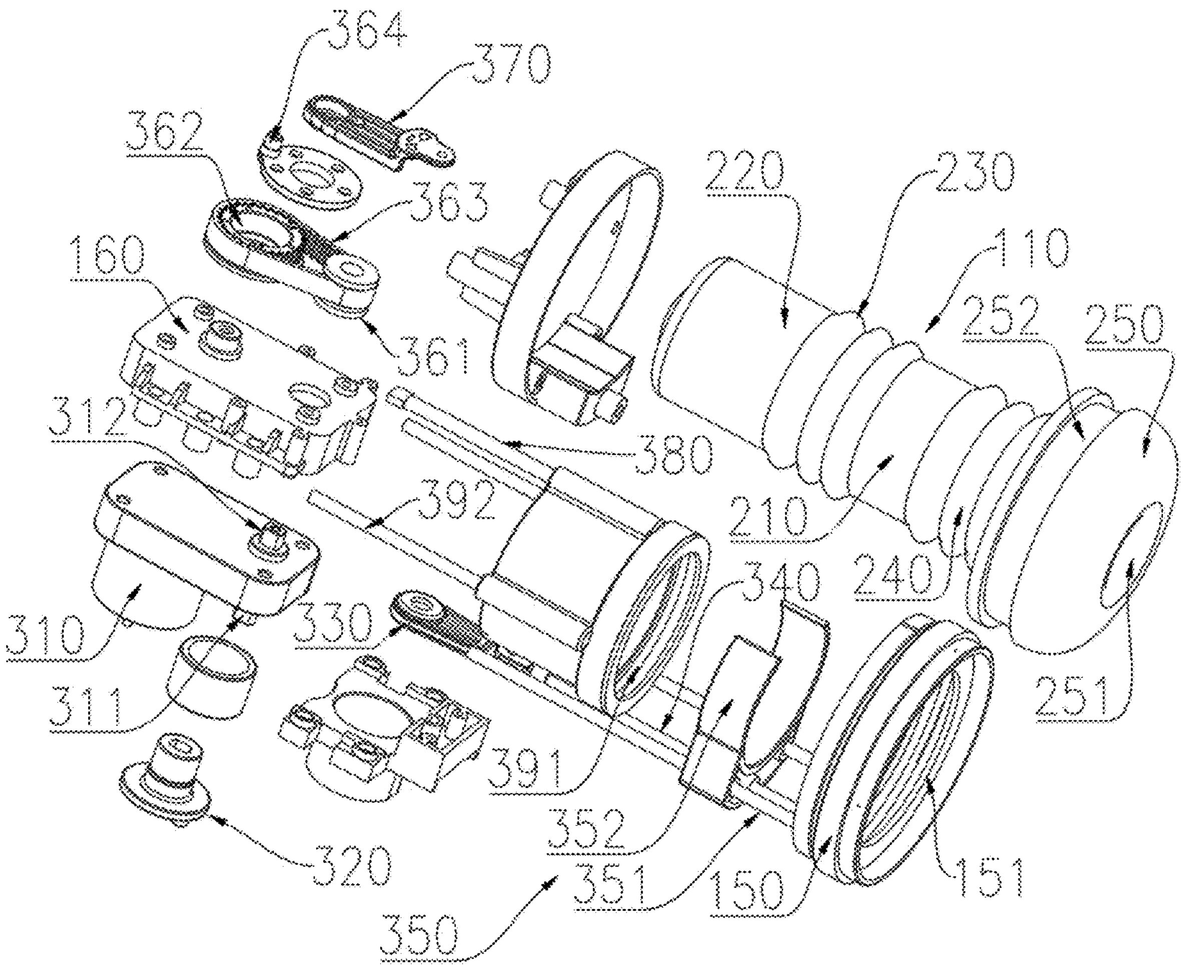
FIG. 7 is an exploded structural view of another perspective of a part of a double-retractable penis massage device according to an example of the present application.

With reference to FIG. 1 to FIG. 7, an example provides a double-retractable penis massage device, including a housing 100, a massage member 200, and a drive device 300. The massage member 200 includes a first sleeve 210 and a second sleeve 220 that are coaxially arranged. The first sleeve 210 and the second sleeve 220 are movably arranged in an axial direction. The first sleeve 210 and/or the second sleeve 220 are/is of a tubular structure. A first massage cavity is arranged in the first sleeve 210. A second massage cavity is arranged in the second sleeve 220. The first sleeve 210 is positioned at a front end of the second sleeve 220. Two ends of the first sleeve 210 are axially arranged in a penetrating manner. One end of the second sleeve 220 close to the first sleeve 210 is an open end, and one end of the second sleeve 220 away from the first sleeve 210 is a closed end, such that a glans penis can penetrate the first massage cavity of the first sleeve 210 and enters the second massage cavity of the second sleeve 220. The drive device 300 is arranged in the housing 100 and connected to the first sleeve 210 and the second sleeve 220 in a transmission manner separately, such that the drive device 300 drives the first sleeve 210 and the second sleeve 220 to reciprocate in the axial direction separately. Reciprocating speeds of the first sleeve 210 and the second sleeve 220 are different and/or reciprocating movements are asynchronous. For example, the reciprocating speed of the first sleeve 210 is higher than the reciprocating speed of the second sleeve 220, or the reciprocating speed of the second sleeve 220 is higher than the reciprocating speed of the first sleeve 210, that is, the reciprocating speeds of the first sleeve 210 and the second sleeve 220 are different. In some possible examples, the reciprocating movements of the first sleeve 210 and the second sleeve 220 are asynchronous. When the first sleeve 210 moves towards the front end of the housing 100, the second sleeve 220 moves away from the front end of the housing 100. Alternatively, when the first sleeve 210 moves away from the front end of the housing 100, the second sleeve 220 moves towards the front end of the housing 100. That is, moving directions of the first sleeve 210 and the second sleeve 220 are opposite at a moment. Certainly, reciprocating strokes of the first sleeve 210 and the second sleeve 220 can be set to be different, such that different retractable massage effects generated by the first sleeve 210 and the second sleeve 220 massage and stimulate the glans penis together, so as to improve a stimulation effect and sperm production efficiency.

It can be seen that the double-retractable penis massage device of the example enables the glans penis to penetrates the first sleeve 210 and enter the second sleeve 220, and the first sleeve 210 and the second sleeve 220 are driven by the drive device 300 to reciprocate in the axial direction separately, such that the first sleeve 210 and the second sleeve 220 perform retractable massage stimulation on different positions of the penis respectively, the first sleeve 210 performs retractable massage on a middle portion of the penis, and the second sleeve 220 performs retractable massage on the glans penis. The reciprocating speeds of the first sleeve 210 and the second sleeve 220 are different or the reciprocating movements are asynchronous, that is, retractable stimulation effects of the first sleeve 210 and the second sleeve 220 are different. In this way, the penis is stimulated by using the multi-stage different retractable massage effects together, such that a stimulation effect on the penis is enhanced, and desirable use experience is brought to a user.

In the example, the first sleeve 210 and the second sleeve 220 are of an integral structure or a separate structure. The first sleeve 210 and the second sleeve 220 are made of flexible material, preferably silicone or rubber material. In an alternative embodiment, the first sleeve 210 and the second sleeve 220 may be made into a separate structure, and the first sleeve 210 and the second sleeve 220 are spaced in the axial direction. In this way, a retractable movement of the first sleeve 210 does not interfere with a retractable movement of the second sleeve 220.

Preferably, the first sleeve 210 and the second sleeve 220 are integrally made of flexible material, preferably silicone or rubber material by injection molding. The integrated structure allows the glans penis to penetrate the first sleeve 210 and enter the second sleeve 220 more smoothly, and the inner cavities of the first sleeve 210 and the second sleeve 220 can be cleaned conveniently. A first corrugated pipe 230 that is retractable in axial length is in communication between the first sleeve 210 and the second sleeve 220. In this way, when the first sleeve 210 and the second sleeve 220 perform respective retractable movements, adaptively telescoping is implemented through a length of the first corrugated pipe 230. Even if the reciprocating movements of the first sleeve 210 and the second sleeve 220 are asynchronous, it is guaranteed that the retractable movements of the first sleeve 210 and the second sleeve 220 do not interfere with each other.

In an example, a first flexible elastomer that can stretch in axial length is in communication between the first sleeve 210 and the second sleeve 220. Two ends of the first flexible elastomer are arranged in a penetrating manner. The first flexible elastomer may be made of silicone or rubber material. A length of the first flexible elastomer may also be stretched depending on elasticity of the first flexible elastomer itself.

Further, a front end of the first sleeve 210 is provided with a positioning portion 250. The positioning portion 250 is fixedly mounted at the front end of the housing 100. A second corrugated pipe 240 that is retractable in axial length is in communication between the first sleeve 210 and the positioning portion 250. A positioning opening 251 for inserting the glans penis into the first sleeve 210 and the second sleeve 220 is formed at a center of the positioning portion 250. The positioning portion 250, the first corrugated pipe 230, the second corrugated pipe 240, the first sleeve 210, and the second sleeve 220 are integrally made of silicone or rubber material to form a sleeve structure. The positioning opening 251 is located at a front end of the sleeve structure. A rear end of the sleeve structure is a closed end. That is, one end of the second sleeve 220 away from the first sleeve 210 is a closed end. In this way, the positioning portion 250 is arranged so as to mount the first sleeve 210 and the second sleeve 220. The penis is supported and positioned through the positioning opening 251 of the positioning portion 250 fixedly arranged. Thus the glans penis can be stimulated by retractable massage in the first sleeve 210 and the second sleeve 220, stability and reliability of the structure are improved, and use is convenient.

In an example, a second flexible elastomer that can stretch in axial length is in communication between the first sleeve 210 and the positioning portion 250. Two ends of the second flexible elastomer are arranged in a penetrating manner. The second flexible elastomer may be made of silicone or rubber material. A length of the second flexible elastomer may also be stretched depending on elasticity of the second flexible elastomer itself.

Specifically, an annular groove 252 is circumferentially formed on an outer peripheral surface of the positioning portion 250. A fixing ring 150 is arranged at the front end of the housing 100. A convex ring 151 is formed on an inner peripheral surface of the fixing ring 150. Thus the convex ring 151 is inserted into the annular groove 252 to fix the positioning portion 250 in the housing 100. The structure is simple and compact, and rapid mounting is facilitated.

In the example, the double-retractable penis massage device further includes a first ring sleeve 352 and a second ring sleeve 391. The first ring sleeve 352 and the second ring sleeve 391 are movably arranged in the housing 100 in the axial direction. The first ring sleeve 352 sleeves the first sleeve 210. The second ring sleeve 391 sleeves the second sleeve 220. The drive device 300 is connected to the first ring sleeve 352 and the second ring sleeve 391 in a transmission manner separately. Thus the drive device 300 can push and pull the first sleeve 210 and the second sleeve 220 to reciprocate through the first ring sleeve 352 and the second ring sleeve 391 respectively, and the structure is more stable and reliable.

A shape of the first ring sleeve 352 is substantially a C-shape or a ring shape. A shape of the second ring sleeve 391 is substantially a cylindrical shape or a C-shape. The first ring sleeve 352 is fixedly connected to the first sleeve 210. The second ring sleeve 391 is fixedly connected to the second sleeve 220. An inner surface of the first ring sleeve 352 and an outer surface of the first sleeve 210 can be fixed by glue. An inner surface of the second ring sleeve 391 and an outer surface of the second sleeve 220 can be fixed by glue. Certainly, other fixing methods can also be used for assembly.

Further, the drive device 300 includes a drive motor 310, a first transmission mechanism and a second transmission mechanism. The drive motor 310 is arranged in the housing 100. The first transmission mechanism is connected between the motor and the first sleeve 210 in a transmission manner. The second transmission mechanism is connected between the motor and the second sleeve 220 in a transmission manner. Thus the first transmission mechanism drives the first sleeve 210 to reciprocate in the axial direction through the motor, and the second transmission mechanism drives the second sleeve 220 to reciprocate in the axial direction through the motor. In this way, two sleeves can be driven to reciprocate simultaneously by one motor, so as to save use of parts, reduce manufacturing cost and reduce complexity of structure assembly.

In the example, the drive motor 310 includes a first output shaft 311 and a second output shaft 312. The drive motor 310 is connected to the first transmission mechanism through the first output shaft 311 in a transmission manner. The drive motor 310 is connected to the second transmission mechanism through the second output shaft 312 in a transmission manner. The drive motor 310 is a motor with double output shafts. For example, the motor may be an existing motor with a speed reducer. Moreover, an output end of the reducer is provided with the first output shaft 311 and the second output shaft 312, such that the first sleeve 210 and the second sleeve 220 can be driven through the first transmission mechanism and the second transmission mechanism respectively to reciprocate when driven by one drive motor 310.

Specifically, the drive device 300 further includes a first guide structure 350 and a second guide structure 390. The first guide structure 350 is arranged between the housing 100 and the first sleeve 210, so as to guide the first sleeve 210 to reciprocate in the axial direction through the first guide structure 350. The second guide structure 390 is arranged between the housing 100 and the second sleeve 220, so as to guide the second sleeve 220 to reciprocate in the axial direction through the second guide structure 390. Accordingly, the mechanism operates more stably and reliably, and a generated retractable massage effect is better.

The first guide structure 350 includes at least one first guide rod 351 and at least one first through hole. The first through hole is formed in the first ring sleeve 352. The first guide rod 351 extends into the housing 100 in a direction parallel to the axial direction. The first guide rod 351 penetrates the first through hole. Thus the first ring sleeve 352 can reciprocate along the first guide rod 351. The second guide structure 390 includes at least one second guide rod 392 and at least one second through hole. The second through hole is formed in the second ring sleeve 391. The second guide rod 392 extends into the housing 100 along the direction parallel to the axial direction. The second guide rod 392 penetrates the second through hole. Thus the second ring sleeve 391 can reciprocate along the second guide rod 392.

Further, the first transmission mechanism includes a first eccentric wheel 320, a first connector 330 and a first connecting rod 340. The first eccentric wheel 320 is connected to the drive motor 310 in a transmission manner. One end of the first connector 330 is hinged to an eccentric portion of the first eccentric wheel 320. The other end of the first connector 330 is hinged to one end of the first connecting rod 340. The other end of the first connecting rod 340 is fixedly connected to the first sleeve 210. The first connecting rod 340 extends in a direction parallel to the axial direction. The other end of the first connecting rod 340 is fixed on the first ring sleeve 352, such that the other end of the first connecting rod 340 is fixedly connected to the first sleeve 210 through the first ring sleeve 352. In this way, when the first eccentric wheel 320 is driven to rotate by the drive motor 310, the first connecting rod 340 is swung, pushed and pulled by the first connector 330 to drive the first ring sleeve 352 and the first sleeve 210 to reciprocate along the first guide rod 351.

Optionally, the second transmission mechanism includes a belt transmission mechanism, a second eccentric wheel 364, a second connector 370 and a second connecting rod 380. An input end of the belt transmission mechanism is connected to the drive motor 310 in a transmission manner. An output end of the belt transmission mechanism is connected to the second eccentric wheel 364 in a transmission manner. One end of the second connector 370 is hinged to an eccentric position of the second eccentric wheel. The other end of the second connector 370 is hinged to one end of the second connecting rod 380. The other end of the second connecting rod 380 is fixedly connected to the second sleeve 220. The second connecting rod 380 extends in a direction parallel to the axial direction. Specifically, the belt transmission mechanism includes a driving wheel 361, a driven wheel 362 and a belt 363. The driving wheel 361 is connected to the drive motor 310 in a transmission manner. The driven wheel 362 is connected to the driving wheel 361 through the belt 363 in a transmission manner. The driven wheel 362 and the driving wheel 361 have different diameters. The other end of the second connecting rod 380 is fixed on the second ring sleeve 391, such that the other end of the second connecting rod 380 is fixedly connected to the second sleeve 220 through the second ring sleeve 391. An end surface of the driven wheel 362 is provided with the second eccentric wheel 364. One end of the second connector 370 is hinged to the eccentric portion of the second eccentric wheel 364. In this way, when the drive motor 310 drives the driving wheel 361 to rotate, the second connecting rod 380 is driven by the driven wheel 362 to push and pull the second ring sleeve 391 and the second sleeve 220 to reciprocate along the second guide rod 392. A plurality of massage protrusions are provided on inner walls of the first sleeve 210 and the second sleeve 220, so as to enhance a stimulation effect of retractable massage on the penis.

The first eccentric wheel 320 is arranged on the first output shaft 311 of the drive motor 310. The driving wheel 361 is arranged on the second output shaft 312 of the drive motor 310. The first output shaft 311 and the second output shaft 312 are coaxially and rotatably arranged. The diameters of the driven wheel 362 and the driving wheel 361 are set to be different. Thus, a speed that a rotating moment of the second output shaft 312 of the driving motor 310 is transmitted to the reciprocating movement of the second sleeve 220 is different from a speed of the reciprocating movement of the first sleeve 210 through a transmission ratio between the driven wheel 362 and the driving wheel 361. In the example, the driven wheel 362 and the driving wheel 361 are belt pulleys, such that the driven wheel 362 is connected to the driving wheel 361 by the belt 363 in a transmission manner. Certainly, in other examples, the driven wheel 362 and the driving wheel 361 can also be connected through gear transmission.

In the example, the housing 100 includes a left housing 110 and a right housing 120 that are buckled to each other, a tail cover 130, and a front cover 140. The tail cover 130, the left housing 110 and the right housing 120 together define an accommodating space. The drive device 300, the first sleeve 210 and the second sleeve 220 are mounted in the accommodating space of the housing 100. The positioning opening 251 allowing the glans penis to be inserted into the first sleeve 210 and the second sleeve 220 is positioned at the front end of the housing 100. The positioning portion 250 is fixedly mounted at the front end of the housing 100 through the fixing ring 150. The front cover 140 removably covers the front end of the housing 100. A battery for supplying power and a circuit board for controlling operation of the double-retractable penis massage device are arranged in the accommodating space of the housing 100. Several control buttons 400 are correspondingly arranged on the circuit board, such that the double-retractable penis massage device can be operated by pressing the control buttons 400.

Specifically, a motor base 160 is arranged in the accommodating space of the housing 100. The drive motor 310 is mounted in the housing 100 through the motor base 160. The first output shaft 311 and the second output shaft 312 of the drive motor 310 respectively penetrate out from two opposite sides of the motor base 160 and are respectively connected to the first transmission mechanism and the second transmission mechanism, that are located at two opposite sides of the motor base 160, in a transmission manner.

In use, a user inserts a penis into the first sleeve 210 and the second sleeve 220 from the positioning opening 251, and starts the drive motor 310 to rotate the first output shaft 311 and the second output shaft 312. When the first output shaft 311 of the drive motor 310 drives the first eccentric wheel 320 to rotate, the first connecting rod 340 is swung, pushed and pulled by the first connector 330 to drive the first ring sleeve 352 and the first sleeve 210 to reciprocate along the first guide rod 351. When the second output shaft 312 of the drive motor 310 drives the driving wheel 361 to rotate, the driven wheel 362 rotates to drive the second connecting rod 380 to push and pull the second ring sleeve 391 and the second sleeve 220 to reciprocate along the second guide rod 392 through the belt 363. Thus, the first sleeve 210 and the second sleeve 220 reciprocate to massage and stimulate the penis in a retractable manner.

It should be understood that when an element is referred to as being "on" or "connected to" another element, it can be directly on the other element or directly connected to the other element or indirectly connected to the other element by an intervening element therebetween. On the contrary, when an element is referred to as being "directly on" or "directly connected to" another element, there are no intervening elements therebetween. Also, it should be noted that if directional indications (such as up, down, left, right, front, back, etc.) are involved in the embodiment of the present disclosure, the directional indications are only used to explain a relative position relationship, a movement condition and the like between various components under a certain posture (as shown in the accompanying drawings). If the specific posture changes, the directional indication changes accordingly.

The above are the preferred embodiments of the present disclosure. It should be noted that those skilled in the art can make several improvements and modifications without departing from the principles of the present disclosure, and these improvements and modifications may be regarded as the protection scope of the present disclosure.

What is claimed is:

1. A double-retractable penis massage device, comprising:

a housing;

a massage member comprising a first sleeve and a second sleeve that are coaxially arranged, wherein the first sleeve and the second sleeve are movably arranged in an axial direction, a first massage cavity is arranged in the first sleeve, a second massage cavity is arranged in the second sleeve, the first sleeve is positioned at a front end of the second sleeve, and two ends of the first massage cavity are axially arranged in a penetrating manner, such that a glans penis penetrates the first massage cavity and enters the second massage cavity; and a drive device arranged in the housing and connected to the first sleeve and the second sleeve in a transmission manner separately, such that the drive device drives the first sleeve and the second sleeve to reciprocate in the axial direction separately, wherein reciprocating speeds of the first sleeve and the second sleeve are different and/or reciprocating movements are asynchronous.

2. The double-retractable penis massage device according to claim 1, wherein the first sleeve and the second sleeve are of an integrated structure or a separate structure, the first sleeve and the second sleeve are made of flexible material.

3. The double-retractable penis massage device according to claim 2, wherein the first sleeve and the second sleeve are integrally made of the flexible material, and a first corrugated pipe or a first flexible elastomer that is retractable in axial length is in communication between the first sleeve and the second sleeve.

4. The double-retractable penis massage device according to claim 3, wherein a positioning portion is fixedly mounted at a front end of the housing, and a positioning opening for inserting a penis into the first sleeve and the second sleeve is formed at a center of the positioning portion.

5. The double-retractable penis massage device according to claim 4, wherein a second corrugated pipe or a second flexible elastomer that is retractable in axial length is in communication between the first sleeve and the positioning portion.

6. The double-retractable penis massage device according to claim 4, wherein an annular groove is circumferentially formed on an outer peripheral surface of the positioning portion, a fixing ring is arranged at the front end of the housing, and a convex ring is formed on an inner peripheral surface of the fixing ring, such that the convex ring is inserted into the annular groove to fix the positioning portion in the housing.

7. The double-retractable penis massage device according to claim 1, further comprising a first ring sleeve and a second ring sleeve, wherein the first ring sleeve and the second ring sleeve are movably arranged in the housing in the axial direction, the first ring sleeve sleeves the first sleeve, the second ring sleeve sleeves the second sleeve, and the drive device is connected to the first ring sleeve and the second ring sleeve in a transmission manner separately.

8. The double-retractable penis massage device according to claim 1, wherein the drive device comprises:

a drive motor, wherein the drive motor is arranged in the housing;

a first transmission mechanism, wherein the first transmission mechanism is connected between the motor and the first sleeve in a transmission manner; and a second transmission mechanism, wherein the second transmission mechanism is connected between the motor and the second sleeve in a transmission manner, such that the first transmission mechanism drives the first sleeve to reciprocate in the axial direction through the motor, and the second transmission mechanism drives the second sleeve to reciprocate in the axial direction through the motor.

9. The double-retractable penis massage device according to claim 8, wherein the drive motor comprises a first output shaft and a second output shaft, the drive motor is connected to the first transmission mechanism through the first output shaft in a transmission manner, and the drive motor is connected to the second transmission mechanism through the second output shaft in a transmission manner.

10. The double-retractable penis massage device according to claim 8, wherein the drive device further comprises:

a first guide structure, wherein the first guide structure is arranged between the housing and the first sleeve, so as to guide the first sleeve to reciprocate axially through the first guide structure; and a second guide structure, wherein the second guide structure is arranged between the housing and the second sleeve, so as to guide the second sleeve to reciprocate axially through the second guide structure.

11. The double-retractable penis massage device according to claim 10, wherein the first transmission mechanism comprises a first eccentric wheel, a first connector and a first connecting rod, the first eccentric wheel is connected to the drive motor in a transmission manner, a first end of the first connector is hinged to an eccentric position of the first eccentric wheel, a second end of the first connector is hinged to a first end of the first connecting rod, and a second end of the first connecting rod is fixedly connected to the first sleeve; and the second transmission mechanism comprises a belt transmission mechanism, a second eccentric wheel, a second connector and a second connecting rod, an input end of the belt transmission mechanism is connected to the drive motor in a transmission manner, an output end of the belt transmission mechanism is connected to the second eccentric wheel in a transmission manner, a first end of the second connector is hinged to an eccentric position of the second eccentric wheel, a second end of the second connector is hinged to a first end of the second connecting rod, and a second end of the second connecting rod is fixedly connected to the second sleeve.

12. A double-retractable penis massage device, comprising:

a housing;

a massage member comprising a first sleeve and a second sleeve that are coaxially arranged, wherein the first sleeve and the second sleeve are movably arranged in an axial direction, the first sleeve and/or the second sleeve are/is of a tubular structure, a first massage cavity is arranged in the first sleeve, a second massage cavity is arranged in the second sleeve, the first sleeve is positioned at a front end of the second sleeve, and two ends of the first massage cavity are axially arranged in a penetrating manner, such that a glans penis penetrates the first massage cavity and enters the second massage cavity; and a drive device arranged in the housing and connected to the first sleeve and the second sleeve in a transmission manner separately, such that the drive device drives the first sleeve and the second sleeve to reciprocate in the axial direction separately, wherein reciprocating speeds of the first sleeve and the second sleeve are different and/or reciprocating movements are asynchronous.

13. The double-retractable penis massage device according to claim 12, wherein the first sleeve and the second sleeve are of an integrated structure or a separate structure, the first sleeve and the second sleeve are made of flexible material.

14. The double-retractable penis massage device according to claim 13, wherein the first sleeve and the second sleeve are integrally made of the flexible material, and a first corrugated pipe or a first flexible elastomer that is retractable in axial length is in communication between the first sleeve and the second sleeve.

15. The double-retractable penis massage device according to claim 14, wherein a positioning portion is fixedly mounted at a front end of the housing, and a positioning opening for inserting a penis into the first sleeve and the second sleeve is formed at a center of the positioning portion, a second corrugated pipe or a second flexible elastomer that is retractable in axial length is in communication between the first sleeve and the positioning portion.

16. The double-retractable penis massage device according to claim 15, wherein an annular groove is circumferentially formed on an outer peripheral surface of the positioning portion, a fixing ring is arranged at the front end of the housing, and a convex ring is formed on an inner peripheral surface of the fixing ring, such that the convex ring is inserted into the annular groove to fix the positioning portion in the housing.

17. The double-retractable penis massage device according to claim 12, further comprising a first ring sleeve and a second ring sleeve, wherein the first ring sleeve and the second ring sleeve are movably arranged in the housing in the axial direction, the first ring sleeve sleeves the first sleeve, the second ring sleeve sleeves the second sleeve, and the drive device is connected to the first ring sleeve and the second ring sleeve in a transmission manner separately.

18. A double-retractable penis massage device, comprising:

a housing;

a massage member comprising a first sleeve and a second sleeve that are coaxially arranged, wherein the first sleeve and the second sleeve are movably arranged in an axial direction, the first sleeve and/or the second sleeve are/is of a tubular structure, a first massage cavity is arranged in the first sleeve, a second massage cavity is arranged in the second sleeve, the first sleeve is positioned at a front end of the second sleeve, two ends of the first sleeve are axially arranged in a penetrating manner, one end of the second sleeve close to the first sleeve is an open end, and one end of the second sleeve away from the first sleeve is a closed end, such that a glans penis penetrates the first massage cavity and enters the second massage cavity; and a drive device arranged in the housing and connected to the first sleeve and the second sleeve in a transmission manner separately, such that the drive device drives the first sleeve and the second sleeve to reciprocate in the axial direction separately, wherein reciprocating speeds of the first sleeve and the second sleeve are different and/or reciprocating movements are asynchronous.

19. The double-retractable penis massage device according to claim 18, wherein the first sleeve and the second sleeve are of an integrated structure or a separate structure, the first sleeve and the second sleeve are made of flexible material.

20. The double-retractable penis massage device according to claim 19, wherein a positioning portion is fixedly mounted at a front end of the housing, and a positioning opening for inserting a penis into the first sleeve and the second sleeve is formed at a center of the positioning portion, a corrugated pipe or a flexible elastomer that is retractable in axial length is in communication between the first sleeve and the positioning portion.

* * * * *